(12) United States Patent
Ashiba

(10) Patent No.: US 9,382,964 B2
(45) Date of Patent: Jul. 5, 2016

(54) CYLINDER APPARATUS

(71) Applicant: HITACHI AUTOMOTIVE SYSTEMS, LTD., Hitachinaka-shi, Ibaraki (JP)

(72) Inventor: Masahiro Ashiba, Naka-gun (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 83 days.

(21) Appl. No.: 14/445,424

(22) Filed: Jul. 29, 2014

(65) Prior Publication Data
US 2015/0034182 A1 Feb. 5, 2015

(30) Foreign Application Priority Data
Jul. 31, 2013 (JP) ................................. 2013-159043

(51) Int. Cl.
| F16F 9/50 | (2006.01) |
| F16F 9/06 | (2006.01) |
| F16F 9/348 | (2006.01) |

(52) U.S. Cl.
CPC ............... *F16F 9/062* (2013.01); *F16F 9/3485* (2013.01); *Y10T 137/7853* (2015.04)

(58) Field of Classification Search
CPC .......... F16F 9/3485; F16F 9/466; F16F 9/063
USPC ........................... 188/282.6, 322.13, 280, 281
See application file for complete search history.

(56) References Cited

U.S. PATENT DOCUMENTS

| 2,138,513 | A | * | 11/1938 | Rossman | ................... F16F 9/34 137/493 |
| 7,213,689 | B2 | * | 5/2007 | Chang | ................... F16F 9/3228 188/280 |
| 2006/0185948 | A1 | * | 8/2006 | Schmitt | ................. F16F 9/3485 188/282.5 |

FOREIGN PATENT DOCUMENTS

JP 2013-029133 2/2013

* cited by examiner

*Primary Examiner* — Robert A Siconolfi
*Assistant Examiner* — Mahbubur Rashid
(74) *Attorney, Agent, or Firm* — Nixon & Vanderhye P.C.

(57) ABSTRACT

A cylinder apparatus includes a flow path formed at a valve member through which a fluid flows when a rod is moved, a valve configured to open and close the flow path, and a restriction member disposed at a side in a direction in which the flow path of the valve is opened. The restriction member is an annular plate-shaped member in which an attachment hole is formed. The restriction member has a plurality of spring sections extending in the radial direction and configured to bias the valve toward the valve member and a stroke restriction section extending from between the neighboring spring sections in the radial direction and configured to restrict a stroke of the valve, which are installed at an outer circumferential side thereof. The stroke restriction section extends to form the same plane as the inner circumferential side of the restriction member.

20 Claims, 5 Drawing Sheets

US 9,382,964 B2

CYLINDER APPARATUS

BACKGROUND OF THE INVENTION

1. Field of the Invention

The present invention relates to a cylinder apparatus.

Priority is claimed on Japanese Patent Application No. 2013-159043, filed Jul. 31, 2013, the content of which is incorporated herein by reference.

2. Description of Related Art

A cylinder apparatus including a configuration having a valve configured to open and close a flow path, a spring configured to bias the valve in a closing direction, and a restriction member configured to restrict stroke of the valve of a predetermined amount or more is known (for example, see Japanese Unexamined Patent Application, First Publication No. 2013-29133).

In the cylinder apparatus, reduction in weight is required.

SUMMARY OF THE INVENTION

The present invention provides a cylinder apparatus in which a weight thereof can be reduced.

According to a first aspect of the present invention, a cylinder apparatus includes a cylinder in which a fluid is sealed; a valve member fitted into the cylinder and configured to partition the inside of the cylinder into at least two chambers; a rod having one end extending to the outside of the cylinder; a flow path formed at the valve member and through which the fluid flows when the rod moves; a valve configured to open and close the flow path; and a restriction member disposed at a side in a direction in which the flow path of the valve is opened. The restriction member is an annular plate-shaped member having an attachment hole into which a fixing rod is inserted. A plurality of spring sections extending in the radial direction and configured to bias the valve toward the valve member and a stroke restriction section extending in the radial direction from between the neighboring spring sections and configured to restrict a stroke of the valve are installed at an outer circumferential side of the restriction member. The stroke restriction section extends to form the same plane as the inner circumferential side of the restriction member.

According to a second aspect of the present invention, the stroke restriction section may have a rib.

According to a third aspect of the present invention, the rib may be formed in a convex shape at a side of the stroke restriction section opposite to the valve.

According to a fourth aspect of the present invention, the rib may have a cross shape.

According to a fifth aspect of the present invention, the rib may be a radial rib extending in the radial direction.

According to a sixth aspect of the present invention, the spring section may come in constant contact with the valve.

According to a seventh aspect of the present invention, the fixing rod may have a small diameter section inserted into the attachment hole of the restriction member and a stepped surface configured to abut one surface of the restriction member. The stepped surface may have an outer diameter abutting the stroke restriction section.

According to the above-mentioned cylinder apparatus, reduction in weight becomes possible.

DETAILED DESCRIPTION OF THE INVENTION

A shock absorber of an embodiment of a cylinder apparatus according to the present invention will be described below with reference to the accompanying drawings.

Figure 1:
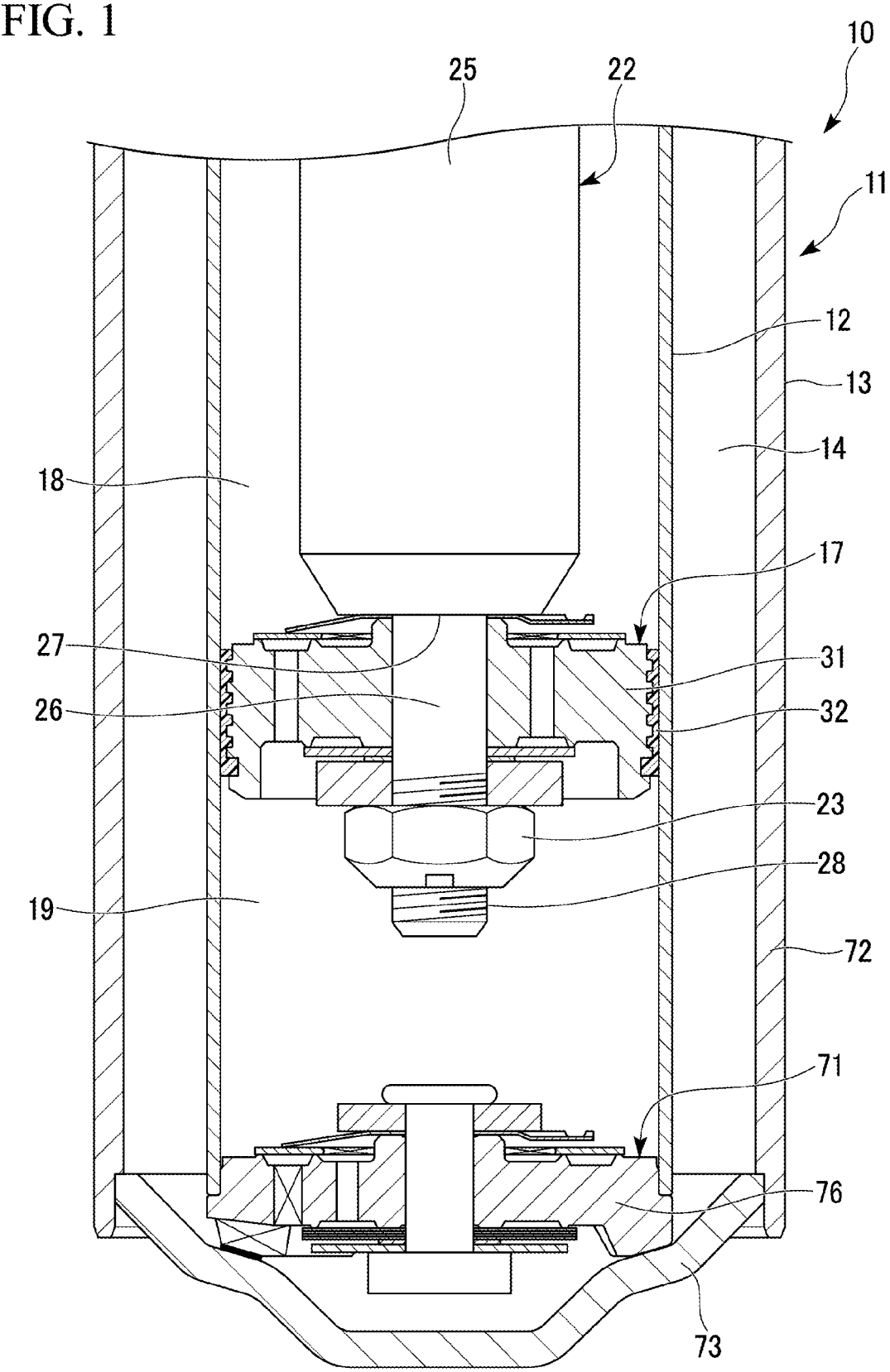
FIG. 1 is a partial cross-sectional view showing a lower section of a shock absorber of an embodiment of a cylinder apparatus according to the present invention.

As shown in FIG. 1, a shock absorber 10 of the embodiment has a cylinder 11 in which a fluid such as a liquid, a gas or the like is sealed. The cylinder 11 has an inner cylinder 12 and an outer cylinder 13 having a larger diameter than the inner cylinder 12 and formed concentrically with the inner cylinder 12 to cover the inner cylinder 12. The cylinder 11 has a dual cylinder structure in which a reservoir chamber 14 is formed between the inner cylinder 12 and the outer cylinder 13.

A piston 17 is slidably fitted in the inner cylinder 12 of the cylinder 11. The piston 17 divides the inside of the inner cylinder 12, i.e., the cylinder 11 into an upper chamber 18 and a lower chamber 19. A working fluid as a fluid is sealed in the cylinder 11, specifically, in the upper chamber 18 and the lower chamber 19, and the working fluid and a gas, as the fluid, are sealed in the reservoir chamber 14.

A second end of a rod 22 serving as a rod member having a first end extending to the outside of the cylinder 11 is inserted into the inner cylinder 12 of the cylinder 11. The piston 17 is fastened to the second end of the rod 22 in the inner cylinder 12 by a nut 23. While not shown, the first end side of the rod 22 is inserted through a rod guide and an oil seal mounted on upper end sections of the inner cylinder 12 and the outer cylinder 13 to extend to the outside.

The rod 22 has a main shaft section 25 and an attachment shaft section 26 that is a small diameter section formed at an end section inside the cylinder 11 and having a smaller diameter than the main shaft section 25. Accordingly, a stepped surface 27 is formed at an end section of the main shaft section 25 near the attachment shaft section 26 in a direction perpendicular to an axis thereof. A male screw 28 threadedly engaged with the nut 23 is formed at a predetermined range of the attachment shaft section 26 opposite to the main shaft section 25.

Figure 2:
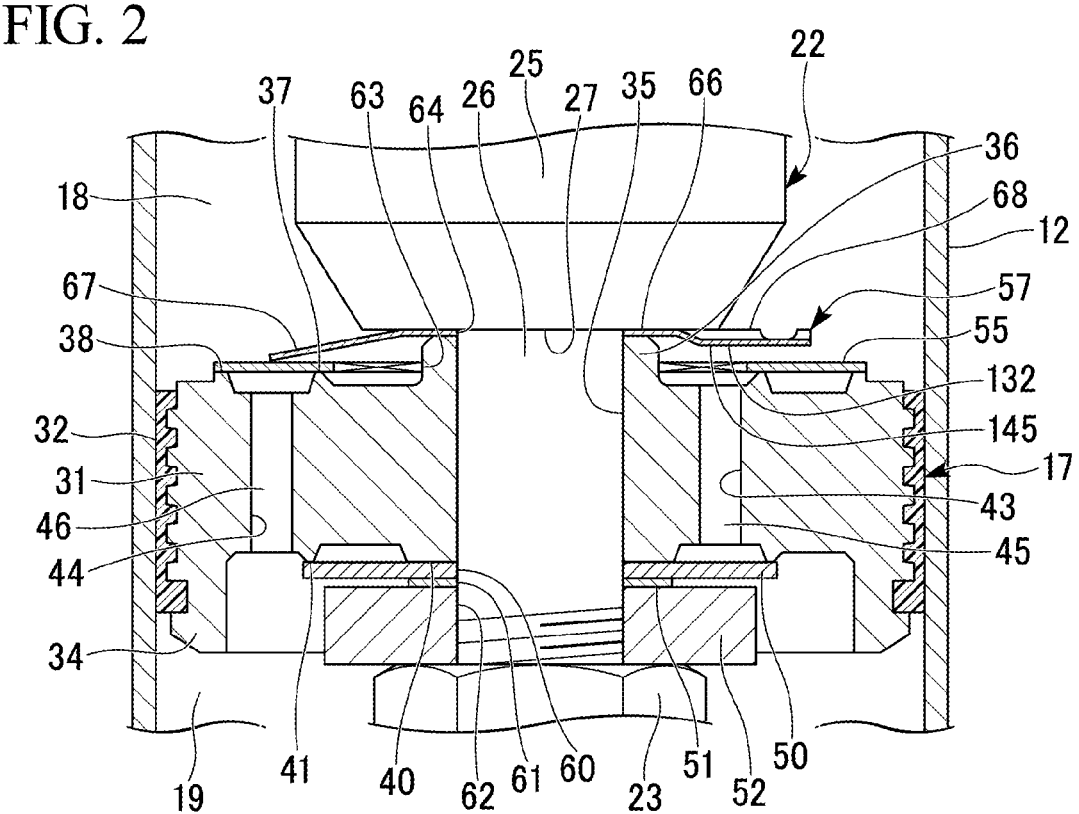
FIG. 2 is a partial cross-sectional view showing a periphery of a piston of the shock absorber of the embodiment of the cylinder apparatus according to the present invention.

As shown in FIG. 2, the piston 17 has a substantially circular plate-shaped piston valve member (a valve member) 31 fitted into the inner cylinder 12 of the cylinder 11 and configured to partition the inner cylinder 12 into two chambers of the upper chamber 18 and the lower chamber 19, and a sliding contact member 32 mounted on an outer circumferential surface of the piston valve member 31 and in sliding contact with the inside of the inner cylinder 12.

As shown in FIG. 2, a cylindrical protrusion 34 protruding in the axial direction is formed at an outer circumferential side of the piston valve member 31 near the lower chamber 19. In addition, an insertion hole 35 is formed at a center in the radial direction of the piston valve member 31 to pass therethrough in the axial direction. In addition, a cylindrical guide boss section 36 protruding in the axial direction at the outside of the insertion hole 35 in the radial direction, an annular inner seat section 37 protruding in the axial direction at farther outside than the guide boss section 36 in the radial direction, and an annular outer seat section 38 protruding in the axial direction at farther outside than the inner seat section 37 in the radial direction are formed at the piston valve member 31 opposite to the cylindrical protrusion 34 in the axial direction. Further, an annular lower attachment boss section 40 protruding in the axial direction at the outside of the insertion hole 35 in the radial direction and an annular seat section 41 protruding in the radial direction at farther outside than the lower attachment boss section 40 and farther inward in the axial direction than the cylindrical protrusion 34 are formed at the piston valve member 31 near the cylindrical protrusion 34 in the axial direction.

Here, height positions of the inner seat section 37 and the outer seat section 38 coincide in the axial direction of the piston valve member 31, and a height position in a protruding direction of the guide boss section 36 is higher than these. In addition, a height in the protruding direction of the seat section 41 is slightly larger than that of the lower attachment boss section 40.

The piston valve member 31 has a plurality of flow path holes 43 each having a first end opened between the guide boss section 36 and the inner seat section 37 and a second end opened between the lower attachment boss section 40 and the seat section 41 to pass through the piston valve member 31 in the axial direction and disposed in the circumferential direction at intervals (in FIG. 2, only one is shown for illustration of a cross-sectional view). In addition, the piston valve member 31 has a plurality of flow path holes 44 having first ends opened between the inner seat section 37 and the outer seat section 38 and second ends opened between the seat section 41 and the cylindrical protrusion 34 to pass through the piston valve member 31 in the axial direction and disposed in the circumferential direction at intervals (in FIG. 2, only one is shown for illustration of a cross-sectional view). The flow path holes 43 of the inside form a first flow path 45 configured to cause a working fluid to flow between the upper chamber 18 and the lower chamber 19. The flow path holes 44 of the outside form a second flow path 46 configured to cause a working fluid to flow between the upper chamber 18 and the lower chamber 19.

The piston 17 has a disk valve 50, a spacer 51 and a valve restriction member 52 disposed at the cylindrical protrusion 34 side in the axial direction of the piston valve member 31 in sequence from the piston valve member 31 side. In addition, the piston 17 has a disk valve (a valve) 55 and a restriction member 57 at a portion of the piston valve member 31 opposite to the cylindrical protrusion 34 in the axial direction in sequence from the piston valve member 31 side.

An insertion hole 60 is formed at a center in the radial direction of the disk valve 50 to pass therethrough in the axial direction. An insertion hole 61 is formed at a center in the radial direction of the spacer 51 to pass therethrough in the axial direction. An insertion hole 62 is formed at a center in the radial direction of the valve restriction member 52 to pass therethrough in the axial direction. The attachment shaft section 26 of the rod 22 is inserted through the insertion hole 60 of the disk valve 50, the insertion hole 61 of the spacer 51 and the insertion hole 62 of the valve restriction member 52. In this state, inner circumferential sides of the disk valve 50, the spacer 51 and the valve restriction member 52 are clamped by the nut 23 and the piston valve member 31.

A guide hole 63 is formed at a center in the radial direction of the disk valve 55 to pass therethrough in the axial direction. The guide boss section 36 of the piston valve member 31 is inserted through the guide hole 63 of the disk valve 55. The disk valve 55 is movable in the axial direction through guidance of the guide boss section 36.

An insertion hole (an attachment hole) 64 is formed at a center in the radial direction of the restriction member 57 to pass therethrough in the axial direction. In a state in which the guide boss section 36 of the piston valve member 31 is inserted through the guide hole 63 of the disk valve 55, the attachment shaft section 26 of the rod 22 is inserted through the insertion hole 64 of the restriction member 57. In this state, an inner circumferential side of the restriction member 57 is clamped by the guide boss section 36 of the piston valve member 31 and the stepped surface 27 of the main shaft section 25 of the rod 22. Accordingly, the disk valve 55 is attached to the piston valve member 31 to be movable in the axial direction, and the restriction member 57 is attached to the piston valve member 31 to be immovable but deformable.

The disk valve 50 of the lower chamber 19 side has an outer diameter slightly larger than that of the seat section 41. The disk valve 50 abuts the lower attachment boss section 40 and the seat section 41 of the piston valve member 31 to close the flow path 45 of the inside. Then, the disk valve 50 is separated from the seat section 41 to open the flow path 45 when the rod 22 protrudes from the inside of the cylinder 11 to move to an extension side (an upper side of FIG. 2) at which a protrusion amount is increased. Accordingly, the flow path 45 of the inside installed at the piston valve member 31 causes the fluid to flow from the upper chamber 18 to the lower chamber 19 when the rod 22 moves to the extension side. The disk valve 50 constitutes a disk valve of the extension side configured to open and close the flow path 45.

The spacer 51 has an outer diameter smaller than that of the disk valve 50 and substantially equal to that of the lower attachment boss section 40. The valve restriction member 52 has an outer diameter larger than that of the spacer 51 and slightly smaller than that of the disk valve 50. The valve restriction member 52 abuts the disk valve 50 to restrict further deformation when the disk valve 50 is deformed to a predetermined amount in a direction separating from the seat section 41.

The disk valve 55 of the upper chamber 18 side has an outer diameter slightly larger than that of the outer seat section 38 of the piston valve member 31. The guide hole 63 of the disk valve 55 has a different shape at a predetermined range having a diameter smaller than that of the inner seat section 37, is supported with respect to the guide boss section 36 to be immovable in the radial direction, and brings the flow path 45 of the inside in constant communication with the upper chamber 18. As described above, the disk valve 55 is guided with respect to the piston valve member 31 by the guide boss section 36 to be movable in the axial direction. That is, both of inner and outer circumferences of the disk valve 55 are lifted with respect to the piston valve member 31 in the axial direction.

The disk valve 55 is moved through guidance of the guide boss section 36 of the piston valve member 31, and abuts the inner seat section 37 and the outer seat section 38 to close the flow path 46 of the outside. Then, the disk valve 55 is separated from the outer seat section 38 to open the flow path 46 of the outside when the rod 22 is moved to a compression side (a lower side of FIG. 2) at which an approach amount to the cylinder 11 is increased. Accordingly, the flow path 46 of the outside formed at the piston valve member 31 causes the fluid to flow from the lower chamber 19 toward the upper chamber 18 when the rod 22 moves to the compression side. The disk valve 55 constitutes a disk valve of the compression side configured to open and close the flow path 46. The restriction member 57 is disposed at a side (an upper side of FIG. 2) in a direction of opening the flow path 46 with respect to the disk valve 55.

The restriction member 57 is formed in an annular shape by forming the insertion hole 64. The restriction member 57 has an attachment base section 66 clamped by the guide boss section 36 of the piston valve member 31 and the stepped surface 27 of the rod 22 at the inner circumferential side, i.e., the insertion hole 64 side, a plurality of spring sections 67 (in FIG. 2, only one is shown for illustration of a cross-sectional view) extending from the attachment base section 66 in the radial direction and in constant contact with the disk valve 55 to bias the disk valve 55 toward the piston valve member 31 in the axial direction, and a plurality of stroke restriction sections 68 (in FIG. 2, only one is shown for illustration of a cross-sectional view) extending from a space between the neighboring spring sections 67 of the attachment base section 66 in the radial direction to restrict a stroke of the disk valve 55. The stroke restriction section 68 abuts the disk valve 55 to restrict lift of a predetermined amount or more when the disk valve 55 is lifted to a predetermined amount in a direction separating from the outer seat section 38 and the inner seat section 37 against a biasing force of the spring section 67. Accordingly, the stroke restriction section 68 also restricts deformation of the spring section 67 deformed by pressing the disk valve 55 of a predetermined amount or more.

As shown in FIG. 1, the outer cylinder 13 has a cylindrical member 72 and a bottom lid member 73 fitted to a lower end of the cylindrical member 72 to close an opening section of the lower end. The bottom lid member 73 is fitted to an inner circumferential section of the cylindrical member 72 at an outer circumferential section thereof. The bottom lid member 73 has a stepped shape to be disposed at the outside in the axial direction farther than a central side in this state. The bottom lid member 73 is fixed to the cylindrical member 72 by welding in a closed state.

A base valve 71 is installed at a lower end section of the inner cylinder 12. The base valve 71 divides the inside of the cylinder 11 into the lower chamber 19 and the reservoir chamber 14. The base valve 71 has a damping valve configured to generate a damping force of the compression side, and a suction valve configured to cause oil liquid to flow while generating substantially no damping force from the reservoir chamber 14 into the cylinder at the extension side.

Figure 3:
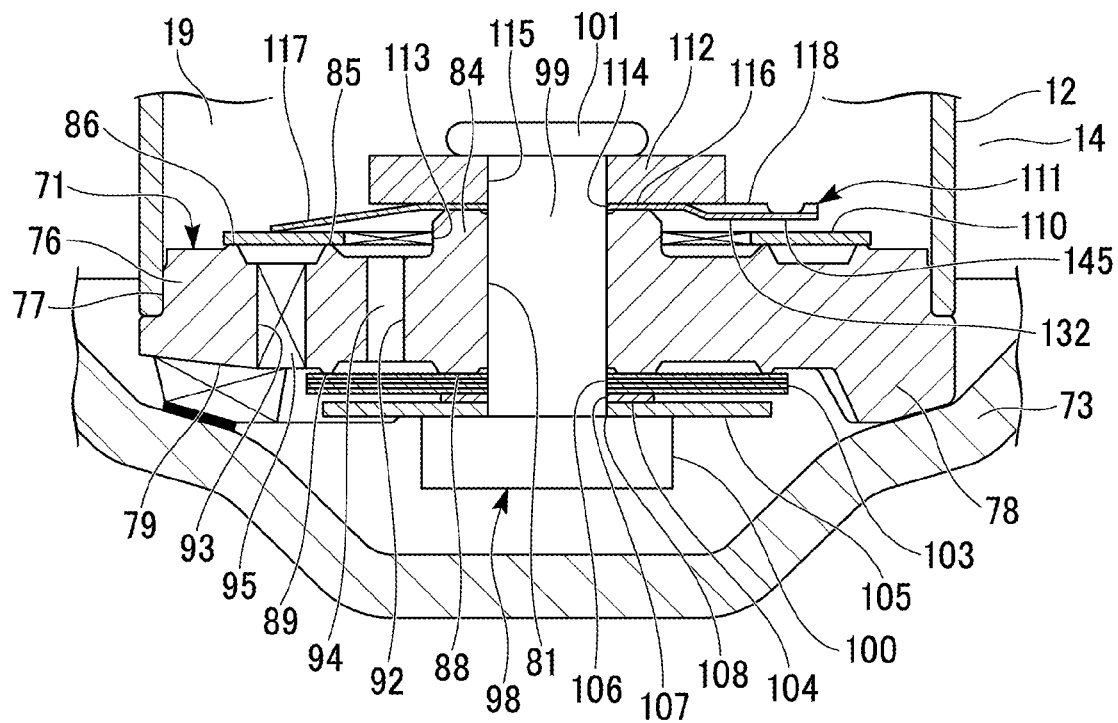
FIG. 3 is a partial cross-sectional view showing a periphery of a base valve of the shock absorber of the embodiment of the cylinder apparatus according to the present invention.

The base valve 71 has a substantially circular plate-shaped base valve member (a valve member) 76 fitted into the cylinder 11 to partition the inside of the cylinder 11 into two chambers of the lower chamber 19 and the reservoir chamber 14. As shown in FIG. 3, the base valve member 76 has a stepped section 77 formed at an upper section of the outer circumferential section and having a diameter smaller than that of a lower section thereof. The base valve 71 is fitted to the inner circumferential section of the lower end of the inner cylinder 12 at the stepped section 77. In addition, the base valve member 76 has an annular protrusion leg section 78 protruding at an outer circumferential side of the lower section in the axial direction. The base valve member 76 abuts the bottom lid member 73 at the protrusion leg section 78. A plurality of (in FIG. 3, only one is shown for illustration of a cross-sectional view) flow path grooves 79 passing in the radial direction are formed at the protrusion leg section 78 in the circumferential direction at intervals. By the flow path groove 79, a range from the outside in the radial direction of the base valve member 76 and the inner cylinder 12 to between the base valve 71 and the bottom lid member 73 becomes the reservoir chamber 14.

An insertion hole 81 is formed at a center in the radial direction of the base valve member 76 to pass therethrough in the axial direction. In addition, a cylindrical guide boss section 84 protruding in the axial direction at the outside of the insertion hole 81 in the radial direction, an annular inner seat section 85 protruding in the axial direction at farther outside than the guide boss section 84 in the radial direction, and an annular outer seat section 86 protruding in the axial direction at farther outside than the inner seat section 85 in the radial direction are formed at the base valve member 76 opposite to the protrusion leg section 78 in the axial direction. Further, an annular lower attachment boss section 88 protruding in the axial direction at the outside of the insertion hole 81 in the radial direction, and an annular seat section 89 disposed farther outside than the lower attachment boss section 88 in the radial direction and further inward than the protrusion leg section 78, and protruding in the axial direction are formed at the base valve member 76 near the protrusion leg section 78 in the axial direction.

Here, height positions of the inner seat section 85 and the outer seat section 86 coincide in the axial direction of the base valve member 76, and a height position of the guide boss section 84 is higher than that in the protruding direction. In addition, the seat section 89 has a height slightly larger than that in the protruding direction of the lower attachment boss section 88.

The base valve member 76 has a plurality of (in FIG. 3, only one is shown for illustration of a cross-sectional view) flow path holes 92 having first ends opened between the guide boss section 84 and the inner seat section 85 and second ends opened between the lower attachment boss section 88 and the seat section 89 to pass therethrough in the axial direction and formed in the circumferential direction at intervals. In addition, the base valve member 76 has a plurality of (in FIG. 2, only one is shown for illustration of a cross-sectional view) flow path holes 93 having first ends opened between the inner seat section 85 and the outer seat section 86 and second ends opened at an opposite side of the lower attachment boss section 88 rather than the seat section 89 to pass therethrough in the axial direction and formed in the circumferential direction at intervals. The flow path hole 93 of the outside is formed to be partially connected to the flow path groove 79 of the protrusion leg section 78. The flow path hole 92 of the inside has one flow path 94 disposed between the lower chamber 19 and the reservoir chamber 14 and configured to cause the working fluid to flow therethrough. The flow path hole 93 of the outside forms the other flow path 95 disposed between the lower chamber 19 and the reservoir chamber 14 and through which the working fluid flows.

The base valve 71 has an attachment pin 98 as a rod member. The attachment pin 98 has a shaft section 99 as a small diameter section inserted into the insertion hole 81 of the base valve member 76, and a head section 100 formed at one end of the shaft section 99 and having a larger diameter than that of the shaft section 99. Further, a swaging section 101 having a larger diameter than the shaft section 99 is formed at the other end of the shaft section 99 opposite to the head section 100 by swaging.

The base valve 71 has a disk valve 103 operating as a damping valve, a spacer 104 and a valve restriction member 105 formed at a portion of the base valve member 76 near the protrusion leg section 78 in the axial direction in sequence from the base valve member 76 side. In addition, the base valve 71 has a disk valve (a valve) 110 operating as a suction valve, a restriction member 111 and a swaging receiving member 112 formed at a portion of the base valve member 76 opposite to the protrusion leg section 78 in the axial direction in sequence from the base valve member 76 side.

An insertion hole 106 is formed at a center in the radial direction of the disk valve 103 to pass therethrough in the axial direction. An insertion hole 107 is formed at a center in the radial direction of the spacer 104 to pass therethrough in the axial direction. An insertion hole 108 is formed at a center in the radial direction of the valve restriction member 105 to pass therethrough in the axial direction. The shaft section 99 of the attachment pin 98 is inserted through the insertion hole 106 of the disk valve 103, the insertion hole 107 of the spacer 104, and the insertion hole 108, of the valve restriction member 105. In this state, inner circumferential sides of the disk valve 103, the spacer 104 and the valve restriction member 105 are clamped by the head section 100 of the attachment pin 98 and the base valve member 76.

A guide hole 113 is formed at a center in the radial direction of the disk valve 110 to pass therethrough in the axial direction. The guide boss section 84 of the base valve member 76 is inserted into the guide hole 113 of the disk valve 110, and the disk valve 110 is movable in the axial direction through guidance of the guide boss section 84.

An insertion hole (an attachment hole) 114 is formed at a center in the radial direction of the restriction member 111 to pass therethrough in the axial direction. An insertion hole 115 is formed at a center in the radial direction of the swaging receiving member 112 to pass therethrough in the axial direction. In a state in which the guide boss section 84 of the base valve member 76 is inserted through the guide hole 113 of the disk valve 110, the shaft section 99 of the attachment pin 98 is inserted through the insertion hole 114 of the restriction member 111 and the insertion hole 115 of the swaging receiving member 112. In this state, inner circumferential sides of the restriction member 111 and the swaging receiving member 112 are clamped by the guide boss section 84 of the base valve member 76 and the swaging section 101 of the attachment pin 98. Accordingly, the disk valve 110 is attached to the base valve member 76 to be movable in the axial direction. The restriction member 111 is attached to the base valve member 76 to be immovable but deformable. The swaging receiving member 112 is immovably attached to the base valve member 76.

The disk valve 103 of the reservoir chamber 14 side is constituted by overlapping a plurality of holed circular plate-shaped disks having the same diameter in the axial direction. The disk valve 103 has an outer diameter slightly larger than that of the seat section 89. The disk valve 103 abuts the lower attachment boss section 88 and the seat section 89 of the base valve member 76 to close the flow path 94 of the inside. Then, the disk valve 103 is separated from the seat section 89 shown in FIG. 3 to open the flow path 94 of the inside when the rod 22 shown in FIG. 1 is moved to the compression side and the piston 17 is moved toward the lower chamber 19 to increase a pressure of the lower chamber 19. Accordingly, the flow path 94 of the inside formed at the base valve member 76 causes the fluid to flow from the lower chamber 19 to the reservoir chamber 14 when the rod 22 is moved to the compression side. The disk valve 103 constitutes a disk valve of the compression side configured to open and close the flow path 94 to generate a damping force. Further, the disk valve 103 accomplishes a function of causing the liquid to flow from the lower chamber 19 to the reservoir chamber 14 such that a remainder of the liquid generated mainly by advance of the rod 22 into the cylinder 11 from a relation with the disk valve 55 of the compression side installed at the piston 17 is discharged. Further, the disk valve of the compression side may be a relief valve configured to relieve the pressure when the pressure in the cylinder increases.

The spacer 104 has an outer diameter smaller than that of the disk valve 103 and substantially equal to that of the lower attachment boss section 88. The valve restriction member 105 has an outer diameter slightly smaller than that of the disk valve 103 and substantially equal to that of the seat section 89. The valve restriction member 105 abuts the disk valve 103 to restrict further deformation when the disk valve 103 is deformed to a predetermined amount in a direction separating from the seat section 89.

The disk valve 110 of the lower chamber 19 side has an outer diameter slightly larger than that of the outer seat section 86. The guide hole 113 of the disk valve 110 has a different shape at a range having a diameter smaller than that of the inner seat section 85, is supported to be immovable with respect to the guide boss section 84 in the radial direction, and brings the flow path 94 of the inside in constant communication with the lower chamber 19. As described above, the disk valve 110 is guided with respect to the base valve member 76 by the guide boss section 84 to be movable in the axial direction. That is, both of inner and outer circumferences of the disk valve 110 are lifted with respect to the base valve member 76 in the axial direction.

The disk valve 110 abuts the inner seat section 85 and the outer seat section 86 of the base valve member 76 to close the flow path 95 of the outside. Then, the disk valve 110 is moved along the guide boss section 84 to be separated from the outer seat section 86 and the inner seat section 85 to open the flow path 95 when the rod 22 shown in FIG. 1 is moved to the extension side and the piston 17 is moved toward the upper chamber 18 to lower the pressure of the lower chamber 19. Accordingly, the flow path 95 of the outside formed at the base valve member 76 causes the fluid to flow from the reservoir chamber 14 toward the lower chamber 19 when the rod 22 is moved to the extension side. The disk valve 110 constitutes a disk valve of the extension side configured to open and close the flow path 95. Further, the disk valve 110 accomplishes a function of causing the liquid to flow from the reservoir chamber 14 to the lower chamber 19 with substantially no resistance (such that the damping force is not output) to supplement a shortage of the liquid mainly according to protrusion of the rod 22 from the cylinder 11 from a relation with the disk valve 50 of the extension side installed at the piston 17. The restriction member 111 is disposed at a side (an upper side of FIG. 3) in a direction of opening the flow path 95 with respect to the disk valve 110.

The restriction member 111 is formed in an annular shape by forming the insertion hole 114. The restriction member 111 has an attachment base section 116 clamped by the guide boss section 84 of the base valve member 76 and the swaging section 101 of the attachment pin 98 at the inner circumferential side, i.e., the insertion hole 114 side, a plurality of (in FIG. 3, only one is shown for illustration of a cross-sectional view) spring sections 117 extending in the radial direction from the attachment base section 116 to come in constant contact with the disk valve 110 and configured to bias the disk valve 110 toward the base valve member 76 in the axial direction, and a plurality of (in FIG. 3, only one is shown for illustration of a cross-sectional view) stroke restriction sections 118 extending in the radial direction from between the neighboring spring sections 117 of the attachment base section 116 and configured to restrict a stroke of the disk valve 110. The stroke restriction section 118 abuts the disk valve 110 to restrict further movement when the disk valve 110 is lifted to a predetermined amount in a direction separating from the outer seat section 86 and the inner seat section 85 against the biasing force of the spring section 117. Accordingly, the stroke restriction section 118 also restricts deformation of the spring section 117 deformed by pressing the disk valve 110 of a predetermined amount or more.

The swaging receiving member 112 has an outer diameter smaller than that of the inner seat section 85 and larger than that of the guide boss section 84. The swaging receiving member 112 forms an end surface of the swaging section 101 near the head section 100 side when the shaft section 99 of the attachment pin 98 is swaged to form the swaging section 101.

Next, the restriction members 57 and 111 will be described in more detail with reference to FIGS. 4A and 4B. Further, since the restriction members 57 and 111 have the same configuration, hereinafter, the restriction member 111 will be described and a corresponding component of the restriction member 57 will be represented in parentheses: the restriction member 111 (57).

Figure 4A:
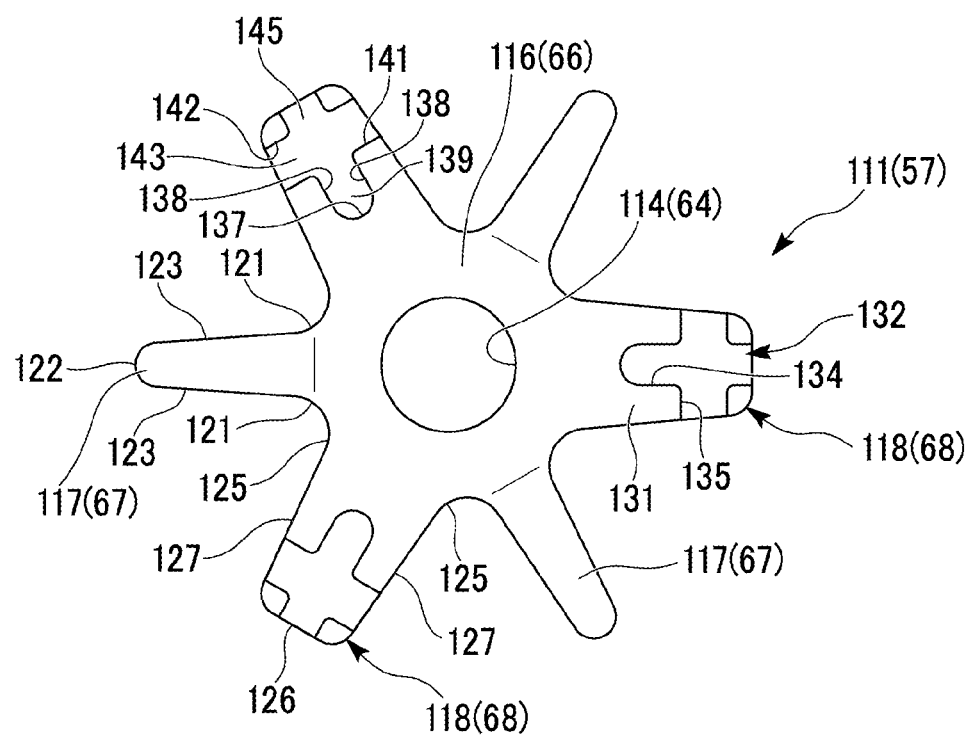
FIG. 4A is a plan view showing a restriction member of the shock absorber of the embodiment of the cylinder apparatus according to the present invention.
Figure 4B:
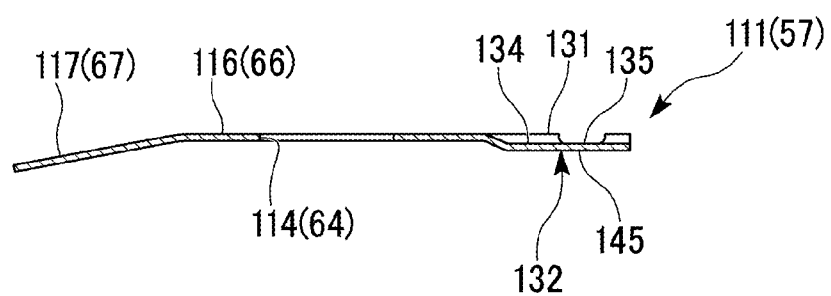
FIG. 4B is a side cross-sectional view showing the restriction member of the shock absorber of the embodiment of the cylinder apparatus according to the present invention.

As shown a natural state in FIGS. 4A and 4B, the restriction member 111 (57) is an integrally formed product constituted by the holed circular plate-shaped attachment base section 116 (66) having the circular insertion hole 114 (64) formed at the center, the plurality of the spring sections 117 (67) extending from the outer circumferential section of the attachment base section 116 (66) outward in the radial direction, and the plurality of stroke restriction sections 118 (68) extending outward from the outer circumferential section of the attachment base section 116 (66) in the radial direction. That is, the restriction member 111 (57) has the attachment base section 116 (66) formed at the inner circumferential side, and the plurality of spring sections 117 (67) and the plurality of stroke restriction sections 118 (68) formed at the outer circumferential side. Further, the spring sections 117 (67) and the stroke restriction sections 118 (68) may each be formed at three places or more, and herein, are formed at three places. That is, the spring section 117 (67) and the stroke restriction section 118 (68) are formed at the same number of places.

The spring sections 117 (67) are formed to be disposed between the two stroke restriction sections 118 (68) neighboring in the circumferential direction of the attachment base section 116 (66), and are always provided at the same number of places. The stroke restriction sections 118 (68) are also formed to be disposed between the two spring sections 117 (67) neighboring in the circumferential direction of the attachment base section 116 (66), and are always provided at the same number of places. Specifically, one of the spring sections 117 (67) is always formed to be disposed at a center between the two stroke restriction sections 118 (68) neighboring in the circumferential direction of the attachment base section 116 (66), and one of the stroke restriction sections 118 (68) is also always formed to be disposed at a center between the two spring sections 117 (67) neighboring in the circumferential direction of the attachment base section 116 (66). As a result, the spring sections 117 (67) and the stroke restriction sections 118 (68) are alternately disposed in the circumferential direction of the attachment base section 116 (66), i.e., the circumferential direction of the restriction member 111 (57) one by one, and the stroke restriction sections 118 (68) extend in the radial direction from between the neighboring spring sections 117 (67) in the circumferential direction of the spring sections 117 (67) extending in the radial direction. An extension length from the attachment base section 116 (66) is slightly larger at the spring section 117 (67) than at the stroke restriction section 118 (68).

As shown in FIG. 4B, the spring section 117 (67) is formed in a flat plate shape in a natural state. The spring section 117 (67) extends in an inclined shape to form an obtuse angle to be disposed at one side in the axial direction as it goes outward in the radial direction with respect to the attachment base section 116 (66) when seen in the radial direction of the attachment base section 116 (66).

In addition, as shown in FIG. 4A, the spring section 117 (67) has two base end edge sections 121 disposed at both sides in the circumferential direction of the attachment base section 116 (66) of the base end side, one distal end edge section 122 of the distal end side, and two side edge sections 123 disposed at both sides in the circumferential direction of the attachment base section 116 (66) to connect the base end edge section 121 and the distal end edge section 122.

Both of the base end edge sections 121 are connected to base end edge sections 125 (to be described below) of the neighboring stroke restriction sections 118 (68), and form an arc shape concaved at the attachment base section 116 (66) side with the base end edge section 125. Both of the side edge sections 123 are inclined at the same angle with respect to a line passing through a center of the attachment base section 116 (66) and a center of the spring section 117 (67) to extend in a straight shape to approach each other as they go toward extended distal end sides. The distal end edge section 122 forms an arc shape protruding forward. Accordingly, the spring section 117 (67) forms a tapered shape as a whole.

As shown in FIG. 4A, the stroke restriction section 118 (68) has the two base end edge sections 125 disposed at both sides in the circumferential direction of the attachment base section 116 (66) at the base end side, one distal end edge section 126 of the distal end side, and two side edge sections 127 disposed at both sides in the circumferential direction of the attachment base section 116 (66) to connect the base end edge section 125 and the distal end edge section 126. Both of the base end edge sections 125 are connected to the base end edge sections 121 of the neighboring spring sections 117 (67), and form an arc shape concaved at the attachment base section 116 (66) side with the base end edge section 121. Both of the side edge sections 127 are inclined at the same angle with respect to a line passing through a center of the attachment base section 116 (66) and a center of the stroke restriction section 118 (68) to form a straight shape to approach each other as they go toward extended distal end sides. The distal end edge section 126 has a straight shape except for both corner sections, and both of the corner sections have an arc shape. Accordingly, the stroke restriction section 118 (68) also has a tapered shape as a whole.

A width in the circumferential direction of the attachment base section 116 (66) of the stroke restriction section 118 (68) is larger than that in the circumferential direction of the attachment base section 116 (66) of the spring section 117 (67). Specifically, a minimum value of the width between both of the side edge sections 127 is larger than a maximum value of the width between both of the side edge sections 123.

The stroke restriction section 118 (68) has a flat plate-shaped base plate section 131 extending to form the same plane as the attachment base section 116 (66) disposed at the inner circumferential side of the restriction member 111 (57), and a rib 132 protruding from the base plate section 131 toward one side in a plate thickness direction. In the axial direction of the attachment base section 116 (66), a protruding direction of the rib 132 with respect to the base plate section 131 coincides with the inclination direction of the spring section 117 (67) with respect to the attachment base section 116 (66).

The rib 132 is formed at a distal end side from an intermediate position in the extending direction of the base plate section 131 from the attachment base section 116 (66). Specifically, the rib 132 is formed from a portion closer to the attachment base section 116 (66) than a center in the extending direction of the base plate section 131 to a distal end. The rib 132 forms a cross shape constituted by a radial rib section 134 formed in the radial direction of the attachment base section 116 (66) at a central position in the circumferential direction of the attachment base section 116 (66) in the base plate section 131, and a circumferential rib section 135 formed in the circumferential direction of the attachment base section 116 (66) at an intermediate position in the extending direction of the radial rib section 134. The circumferential rib section 135 is disposed at an opposite side of the attachment base section 116 (66) rather than a center in the extending direction of the base plate section 131 and configured to cross the base plate section 131 in the radial direction of the attachment base section 116 (66).

The end section of the radial rib section 134 near the attachment base section 116 (66) has a base end wall section 137 configured to form a semi-circular shape having a central axis at an opposite side of the attachment base section 116 (66) and protruding from the base plate section 131 in the plate thickness direction, a pair of sidewall sections 138 protruding from the base plate section 131 in the plate thickness direction to extend in the radial direction of the attachment base section 116 (66) from both ends of the base end wall section 137 in the circumferential direction of the attachment base section 116 (66), and a bottom plate section 139 configured to connect end edge sections of the base end wall section 137 and the pair of sidewall sections 138 opposite to the base plate section 131. The bottom plate section 139 is substantially parallel to the base plate section 131.

The circumferential rib section 135 has an inner sidewall section 141 protruding from the base plate section 131 in the plate thickness direction to extend in the circumferential direction of the attachment base section 116 (66) at the attachment base section 116 (66) side, an outer sidewall section 142 protruding from the base plate section 131 in the plate thickness direction to extend in the circumferential direction of the attachment base section 116 (66) at a side of the inner sidewall section 141 opposite to the attachment base section 116 (66), and a bottom plate section 143 configured to connect end edge sections of the inner sidewall section 141 and the outer sidewall section 142 opposite to the base plate section 131. The bottom plate section 143 is substantially parallel to the base plate section 131.

The intermediate positions in the extending direction of the pair of sidewall sections 138 of the radial rib section 134 are interrupted by formation of the circumferential rib section 135. The intermediate positions in the extending direction of the inner sidewall section 141 and the outer sidewall section 142 of the circumferential rib section 135 are also interrupted by formation of the radial rib section 134. In addition, the bottom plate section 139 of the radial rib section 134 and the bottom plate section 143 of the circumferential rib section 135 are perpendicular to each other at the intermediate positions to form a cross shape, constituting a bottom plate section 145 of the rib 132.

As shown in FIG. 4B, in the axial direction of the attachment base section 116 (66), a maximum distance between the attachment base section 116 (66) and the spring section 117 (67) is larger than a maximum distance between the attachment base section 116 (66) and the bottom plate section 145 of the rib 132. In other words, in the axial direction of the attachment base section 116 (66), the rib 132 of the stroke restriction section 118 (68) has a protrusion height from the attachment base section 116 (66) smaller than a protrusion height from the attachment base section 116 (66) of the spring section 117 (67).

Specifically, the restriction member 111 (57) is a plate-shaped member formed in the above-mentioned shape by punching and bending one metal plate formed of a spring steel material using a pressing machine.

Here, in a natural state, the restriction member 111 has a protrusion amount from the attachment base section 116 in the axial direction of the attachment base section 116, which is smaller at the stroke restriction section 118 and is larger at the spring section 117, with respect to a value obtained by subtracting the plate thickness of the disk valve 110 from a height difference between the guide boss section 84 of the base valve member 76, and the inner seat section 85 and the outer seat section 86 shown in FIG. 3.

The restriction member 111 is disposed between the swaging receiving member 112, the base valve member 76 and the disk valve 110 in a direction in which the spring section 117 and the stroke restriction section 118 protrude from the attachment base section 116 toward the disk valve 110, and clamped by the guide boss section 84 of the base valve member 76 and the swaging receiving member 112 in the attachment base section 116. In the clamped state, the rib 132 of the stroke restriction section 118 is formed in a convex shape at a side of the stroke restriction section 118 opposite to the disk valve 110.

In the clamped state, when the pressure difference is not provided between both sides of the disk valve 110, from the above-mentioned height relation, with respect to the disk valve 110 in the valve-closed state in which the disk valve 110 abuts the inner seat section 85 and the outer seat section 86 to close the flow path 95, while all the plurality of spring sections 117 abut the disk valve 110 to be deformed, the plurality of stroke restriction sections 118 are separated from each other without abutting as a whole. Here, the spring section 117 abuts a position of the disk valve 110 between the inner seat section 85 and the outer seat section 86.

Here, the spring section 117 is set to have a small spring constant. More specifically, the spring section 117 generates only a minimum biasing force needed for causing the disk valve 110 to abut the inner seat section 85 and the outer seat section 86 even when the spring section 117 is deformed. For this reason, in the disk valve 110, when the pressure of the lower chamber 19 is equal to or larger than that of the reservoir chamber 14, the flow path 95 can be securely closed by the biasing force of the spring section 117, and when the pressure of the lower chamber 19 is smaller than that of the reservoir chamber 14, the spring section 117 is immediately separated from the inner seat section 85 and the outer seat section 86 to open the flow path 95 while pressing and deforming the spring section 117, which is easily deformable.

When the disk valve 110 is further lifted and abuts the bottom plate section 145 of the rib 132 of the stroke restriction section 118, since stiffness of the stroke restriction section 118 is unlikely to vary highly, the lift is restricted and stopped by the stroke restriction section 118. The disk valve 110 also restricts further deformation of the spring section 117 of the restriction member 111 when the lift is restricted and stopped by the stroke restriction section 118. The spring section 117 of the restriction member 111 comes in constant contact with the disk valve 110 regardless of the lift position. Further, the disk valve 110 itself is a check valve configured to generate substantially no damping force, and a check valve configured to open a valve when a piston speed is at least 0.05 m/s or less.

In the natural state, the restriction member 57 has a protrusion amount from the attachment base section 66 in the axial direction of the attachment base section 66, which is smaller at the stroke restriction section 68 and is larger at the spring section 67, with respect to a value obtained by subtracting a plate thickness of the disk valve 55 from a height difference between the guide boss section 36 of the piston valve member 31, and the inner seat section 37 and the outer seat section 38 shown in FIG. 2.

As shown in FIG. 2, the restriction member 57 is disposed between the stepped surface 27 of the rod 22, the piston valve member 31 and the disk valve 55 in a direction in which the spring section 67 and the stroke restriction section 68 protrude from the attachment base section 66 toward the disk valve 55. The restriction member 57 is clamped by the stepped surface 27 of the rod 22 and the guide boss section 36 of the piston valve member 31 at the attachment base section 66. In this state, the rib 132 of the stroke restriction section 68 is formed in a convex shape at a side of the stroke restriction section 68 opposite to the disk valve 55.

In the clamped state, when a pressure difference is not provided between both sides of the disk valve 55, from the above-mentioned height relation, with respect to the disk valve 55 in the valve-closed state in which the disk valve 55 abuts the inner seat section 37 and the outer seat section 38 to close the flow path 46, while the plurality of spring sections 67 abut and are deformed as a whole, the plurality of the stroke restriction sections 68 are separated without abutting as a whole. Here, the spring section 67 abuts a position between the inner seat section 37 and the outer seat section 38 of the disk valve 55.

Here, the spring section 67 is set to have a small spring constant. More specifically, the spring section 67 is configured to generate only a minimum biasing force needed to cause the disk valve 55 to abut the inner seat section 37 and the outer seat section 38 even when the spring section 67 is deformed. For this reason, in the disk valve 55, when the pressure of the upper chamber 18 is equal to or larger than that of the lower chamber 19, the flow path 46 can be securely closed by the biasing force of the spring section 67, and when the pressure of the upper chamber 18 is smaller than that of the lower chamber 19, the spring section 67 is immediately separated from the inner seat section 37 and the outer seat section 38 to open the flow path 46 while pressing and deforming the spring section 67, which is easily deformable.

When the disk valve 55 is further lifted and abuts the bottom plate section 145 of the rib 132 of the stroke restriction section 68, since stiffness of the stroke restriction section 68 is unlikely to vary highly, the lift is restricted and stopped by the stroke restriction section 68. The disk valve 55 also restricts further deformation of the spring section 67 of the restriction member 57 when the lift is restricted and stopped by the stroke restriction section 118. The spring section 67 of the restriction member 57 comes in constant contact with the disk valve 55 regardless of the lift position.

In the shock absorber 10 of the embodiment, when the rod 22 is moved to the extension side with respect to the cylinder 11 with the piston 17, the pressure of the upper chamber 18 is increased to be higher than that of the lower chamber 19, and the pressure difference is applied to the disk valve 50 of the piston 17. When the pressure difference is equal to or larger than a predetermined value, the oil liquid of the upper chamber 18 flows into the lower chamber 19 via the flow path 45 while opening the disk valve 50, and the flow rate is throttled at a gap between the disk valve 50 and the seat section 41 and the flow path 45 to generate the damping force. In addition, when the rod 22 is moved to the extension side in this way, as the rod 22 protrudes from the cylinder 11, a liquid amount of the working fluid in the lower chamber 19 as well as the upper chamber 18 becomes insufficient. As a result, when the pressure of the lower chamber 19 is smaller than that of the reservoir chamber 14, since the disk valve 110 is only pressed by the spring section 117 having a small spring constant of the restriction member 111, the disk valve 110 is immediately separated from the outer seat section 86 and the inner seat section 85 to open the flow path 95 while deforming the spring section 117, and liquid supplementation from the reservoir chamber 14 into the lower chamber 19 is performed. Here, the disk valve 110 abuts the stroke restriction section 118 of the restriction member 111 to restrict lift of a predetermined amount or more. Since the spring section 117 has a small spring constant, the disk valve 110 itself generates substantially no damping force without resistance against the valve opening of the disk valve 110.

In addition, when the rod 22 is moved to the compression side with respect to the cylinder 11 with the piston 17, the pressure of the lower chamber 19 is larger than that of the upper chamber 18, and the pressure difference is applied to the disk valve 55 of the piston 17. When the pressure difference becomes a predetermined value or more, since the disk valve 55 is only pressed by the spring section 67 having a small spring constant of the restriction member 57, the disk valve 55 is immediately separated from the inner seat section 37 and the outer seat section 38 to open the flow path 46 while deforming the spring section 67, the working fluid flows from the lower chamber 19 into the upper chamber 18, and a flow rate is throttled through the flow path 46 to generate the damping force. Here, the disk valve 55 abuts the stroke restriction section 118 of the restriction member 57 to restrict lift to a predetermined amount or more.

The shock absorber disclosed in the above-mentioned Japanese Unexamined Patent Application, First Publication No. 2013-29133 has the spring member configured to bias the disk valve, and the valve restriction member configured to restrict deformation of the disk valve of a predetermined amount or more and deformation of the spring member of a predetermined amount or more, which are installed at the piston. In addition, the spring member configured to bias the disk valve and the valve restriction member configured to restrict deformation of the disk valve of a predetermined amount or more and deformation of the spring member of a predetermined amount or more or are also installed at the base valve.

On the other hand, according to the shock absorber 10 of the embodiment, the restriction member 57 installed at the piston 17 has the plurality of spring sections 67 extending in the radial direction and configured to bias the disk valve 55 toward the piston valve member 31, and the stroke restriction section 68 extending in the radial direction from between the neighboring spring sections 67 to form the same plane as the attachment base section 66 to restrict a stroke of the disk valve 55, which are formed at the outer circumferential side thereof. For this reason, the valve restriction member can be omitted. Accordingly, the number of parts can be reduced and the weight can be reduced. In addition, the restriction member 111 installed at the base valve 71 has the plurality of spring sections 117 extending in the radial direction and configured to bias the disk valve 110 toward the base valve member 76, and the stroke restriction section 118 extending in the radial direction configured to form from the neighboring spring sections 117 to form the same plane as the attachment base section 116 to restrict a stroke of the disk valve 110, which are formed at the outer circumferential side. For this reason, instead of the valve restriction member, the swaging receiving member 112 finished with a small diameter may be formed. Accordingly, reduction in weight becomes possible.

In addition, since the stroke restriction sections 68 and 118 of the restriction members 57 and 111 have the ribs 132, stiffness can be increased, and stroke of the disk valves 55 and 110 can be more securely restricted of a predetermined amount or more.

In addition, the rib 132 of the stroke restriction section 68 is formed in a convex shape at an opposite side of the disk valve 55. Accordingly, the rib 132 does not protrude from the attachment base section 66 at the opposite side of the disk valve 55. Accordingly, the restriction member 57 can be appropriately attached to the stepped surface 27 of the rod 22 without interference with the rib 132. Similarly, the rib 132 of the stroke restriction section 118 is formed in a convex shape at a side opposite to the disk valve 110. Accordingly, the rib 132 does not protrude from the attachment base section 116 at the opposite side of the disk valve 110. Accordingly, the restriction member 111 can be appropriately attached to the swaging receiving member 112 without interference with the rib 132.

In addition, since the rib 132 has a cross shape, stiffness of the stroke restriction sections 68 and 118 of the restriction members 57 and 111 can be further increased, and stroke of the disk valves 55 and 110 can be more securely restricted of a predetermined amount or more.

In addition, since the spring sections 67 and 117 of the restriction members 57 and 111 come in constant contact with the disk valves 55 and 110, the closed state of the disk valves 55 and 110 can be appropriately maintained.

Figure 5A:
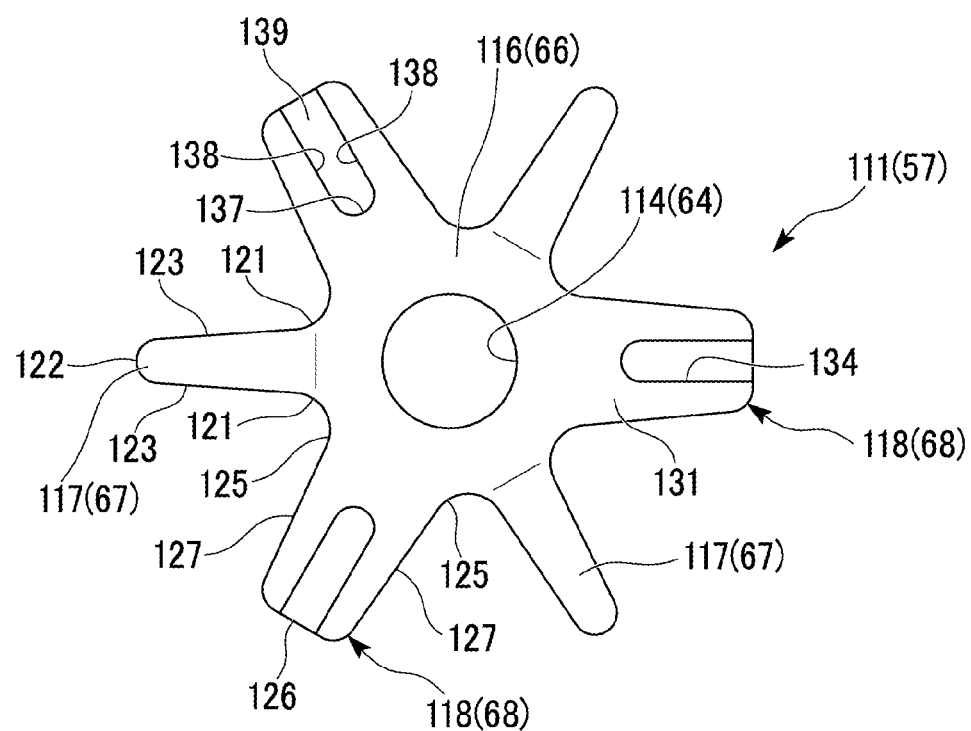
FIG. 5A is a plan view showing a modified example of the restriction member of the shock absorber of the embodiment of the cylinder apparatus according to the present invention.
Figure 5B:
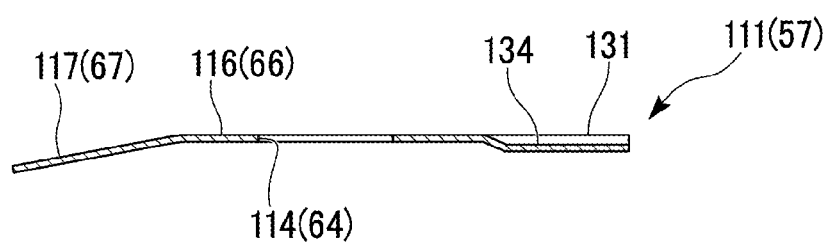
FIG. 5B is a side cross-sectional view showing the modified example of the restriction member of the shock absorber of the embodiment of the cylinder apparatus according to the present invention.

Further, as shown in FIGS. 5A and 5B, only the radial rib section 134 may be formed at the stroke restriction section 118 (68) of the restriction member 111 (57) without forming the circumferential rib section.

Figure 6A:
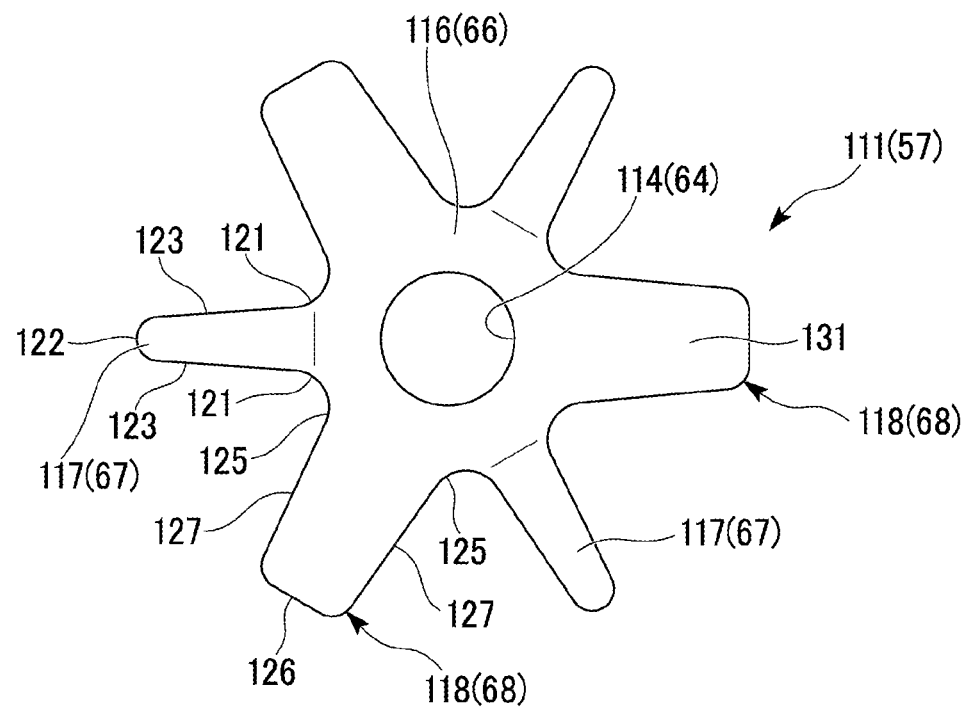
FIG. 6A is a plan view showing the modified example of the restriction member of the shock absorber of the embodiment of the cylinder apparatus according to the present invention.
Figure 6B:
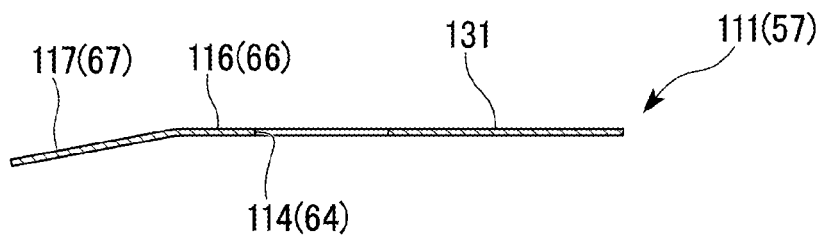
FIG. 6B is a side cross-sectional view showing the modified example of the restriction member of the shock absorber of the embodiment of the cylinder apparatus according to the present invention.

In addition, as shown in FIGS. 6A and 6B, the stroke restriction section 118 (68) of the restriction member 111 (57) may be flat without forming a rib. When the rib is not formed, a plate thickness of the restriction member 111 (57) is increased to be as stiff as the restriction member having the rib. When the plate thickness of the restriction member 111 (57) is increased, since the stiffness of the spring section 117 is also increased, a width of the spring section 117 may be appropriately reduced.

Further, the spring section 117 may entirely abut the disk valve 110 in the valve-closed state. This is because, when the rod 22 is shifted from the state in which the rod 22 is moved to the extension side with respect to the cylinder 11 with the piston 17 to the state in which it is moved to the compression side, the disk valve 110 can immediately abut the outer seat section 86 and the inner seat section 85 to close the flow path 95 such that a flow of the working fluid from the lower chamber 19 into the reservoir chamber 14 can be stopped. However, the spring section 117 may have a gap without entirely abutting the disk valve 110 in the valve-closed state. In this case, a time until the disk valve 110 abuts the outer seat section 86 and the inner seat section 85 is increased in comparison with the case of abutment.

In addition, in the embodiment, while the restriction member 111, the swaging receiving member 112, and so on, are clamped and fixed with respect to the base valve member 76 by swaging, they may be fixed by a screw and a nut like the piston 17. In this case, the swaging receiving member 112 may also be omitted.

The above-mentioned embodiment is a cylinder apparatus including a cylinder in which a fluid is sealed, a valve member fitted into the cylinder and configured to partition the inside of the cylinder into at least two chambers, a rod having one end extending to the outside of the cylinder, a flow path formed at the valve member and through which a fluid flows when the rod is moved, a valve configured to open and close the flow path, and a restriction member disposed at a side in a direction in which the flow path of the valve is opened. The restriction member is an annular plate-shaped member in which an attachment hole is formed. A plurality of spring sections extending in the radial direction and configured to bias the valve toward the valve member, and a stroke restriction section extending from between the neighboring spring sections in the radial direction and configured to restrict a stroke of the valve are installed at an outer circumferential side of the restriction member. The stroke restriction section is characterized to extend to form the same plane as the inner circumferential side of the restriction member. Accordingly, an exclusive member configured to restrict the stroke of the valve can be omitted. Accordingly, reduction in weight becomes possible.

In addition, since the stroke restriction section has the rib, stiffness can be further increased, and stroke of the valve can be more securely restricted of a predetermined amount or more.

In addition, since the rib is formed in a convex shape at a side of the stroke restriction section opposite to the valve, a structure in which the rib is hard to interfere with the other parts upon attachment is provided.

In addition, since the rib has a cross shape, stiffness can be further increased, and stroke of the valve can be more securely restricted to a predetermined amount or more.

In addition, since the rib is a radial rib extending in the radial direction, stiffness can be increased, and stroke of the valve can be more securely restricted of a predetermined amount or more.

In addition, since the spring section comes in constant contact with the valve, a closed state of the valve can be appropriately maintained.

In addition, the fixing rod has a small diameter section inserted into the attachment hole of the restriction member and a stepped surface configured to abut one surface of the restriction member, and the stepped surface has an outer diameter abutting the stroke restriction section.

Further, in the embodiment, while an example in which the disk valve is used as the valve has been shown, the present invention is not limited thereto but a poppet valve or the like may be used.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:
1. A cylinder apparatus comprising:
a cylinder in which a fluid is sealed;

a valve member fitted into the cylinder and configured to partition the inside of the cylinder into at least two chambers;

a rod having one end extending to the outside of the cylinder;

a flow path formed at the valve member and through which the fluid flows when the rod is moved;

a valve configured to open and close the flow path; and a restriction member disposed at a side in a direction in which the flow path of the valve is opened, wherein the restriction member is an annular plate-shaped member having an attachment hole into which a fixing rod is inserted, the restriction member includes:

a plurality of spring sections extending in the radial direction and configured to bias the valve toward the valve member; and a stroke restriction section extending from between the neighboring spring sections in the radial direction and configured to restrict a stroke of the valve installed at an outer circumferential side thereof, and wherein the stroke restriction section has a rib and extends to form the same plane as the inner circumferential side of the restriction member.

2. The cylinder apparatus according to claim 1, wherein the rib is formed in a convex shape at a side of the stroke restriction section opposite to the valve.

3. The cylinder apparatus according to claim 1, wherein the rib has a cross shape.

4. The cylinder apparatus according to claim 1, wherein the rib is a radial rib extending in the radial direction.

5. The cylinder apparatus according to claim 1, wherein the valve is a disk valve having a guide hole at a center in the radial direction and configured to be movable in the axial direction, and the spring section comes in constant contact with the valve.

6. The cylinder apparatus according to claim 2, wherein the valve is a disk valve having a guide hole at a center in the radial direction and configured to be movable in the axial direction, and the spring section comes in constant contact with the valve.

7. The cylinder apparatus according to claim 3, wherein the spring section comes in constant contact with the valve.

8. The cylinder apparatus according to claim 4, wherein the spring section comes in constant contact with the valve.

9. The cylinder apparatus according to claim 1, wherein the valve member is a piston valve member to which the rod is fastened and the piston valve member is slidably fitted into the cylinder, the fixing rod is the rod and has a small diameter section inserted into the attachment hole of the restriction member and a stepped surface configured to abut one surface of the restriction member, and the stepped surface has an outer diameter abutting the stroke restriction section.

10. The cylinder apparatus according to claim 9, wherein the rib is provided at a position where the rib faces the stepped surface in the axial direction.

11. The cylinder apparatus according to claim 2, wherein the valve member is a piston valve member to which the rod is fastened and the piston valve member is slidably fitted into the cylinder, the fixing rod is the rod and has a small diameter section inserted into the attachment hole of the restriction member and a stepped surface configured to abut one surface of the restriction member, and the stepped surface has an outer diameter abutting the stroke restriction section.

12. The cylinder apparatus according to claim 1, wherein the cylinder has an inner cylinder and an outer cylinder, the valve member is a base valve member fitted into the inner cylinder and dividing a chamber inside the inner cylinder and a reservoir chamber between the inner cylinder and the outer cylinder, the fixing rod is a rod member inserted into the base valve member and has a small diameter section inserted into the attachment hole of the restriction member and a large diameter section having a larger diameter than the small diameter section, an annular receiving member is provided between the large diameter section and the restriction member, and the receiving member has an outer diameter abutting the stroke restriction section.

13. The cylinder apparatus according to claim 12, wherein the base valve member includes an annular inner seat section to which the valve is configured to abut and separate and an annular outer seat section to which the valve is configured to abut and separate, the annular outer seat section disposed at outside than the inner seat section in the radial direction, the flow path is formed between the inner seat section and the outer seat section, the receiving member has a smaller diameter than the diameter of the inner seat section, and the rib is provided at a position where the rib faces the receiving member in the axial direction.

14. The cylinder apparatus according to claim 2, wherein the cylinder has an inner cylinder and an outer cylinder, the valve member is a base valve member fitted into the inner cylinder and dividing a chamber inside the inner cylinder and a reservoir chamber between the inner cylinder and the outer cylinder, the fixing rod is a rod member inserted into the base valve member and has a small diameter section inserted into the attachment hole of the restriction member and a swaging section having a larger diameter than the small diameter section, a swaging receiving member is provided between the swaging section and the restriction member, and the swaging receiving member has an outer diameter abutting the stroke restriction section.

15. A cylinder apparatus comprising:
a cylinder in which a fluid is sealed;
a valve member fitted into the cylinder and configured to partition the inside of the cylinder into at least two chambers;
a rod having one end extending to the outside of the cylinder;
a flow path formed at the valve member and through which the fluid flows when the rod is moved;
a valve configured to open and close the flow path; and
a restriction member disposed at a side in a direction in which the flow path of the valve is opened,
wherein the restriction member is a plate-shaped member, the restriction member includes:
an attachment base section provided at an inner circumferential side of the restriction member;
a plurality of spring sections extending in the radial direction from an outer circumferential side of the attachment base section and configured to bias the valve toward the valve member; and
a stroke restriction section extending from between the neighboring spring sections in the radial direction from the outer circumferential side of the attachment base section and configured to restrict a further stroke of the valve when the valve has been moved a predetermined amount against the biasing force of the spring section; and the stroke restriction section has a rib.

16. The cylinder apparatus according to claim 15, wherein the rib is formed in a convex shape at a side opposite to the valve and the rib has a cross shape.

17. The cylinder apparatus according to claim 16, wherein the spring section comes in constant contact with the valve.

18. The cylinder apparatus according to claim 15, wherein the rib is formed in a convex shape at a side opposite to the valve and the rib is a radial rib extending in the radial direction.

19. The cylinder apparatus according to claim 18, wherein the spring section comes in constant contact with the valve.

20. The cylinder apparatus according to claim 15, wherein the valve is a disk valve having a guide hole at a center in the radial direction and configured to be movable in the axial direction, and the spring section comes in constant contact with the valve.

* * * * *